(12) United States Patent
Li

(10) Patent No.: US 11,387,740 B1
(45) Date of Patent: Jul. 12, 2022

(54) ENERGY RECYCLE CIRCUIT FOR FLYBACK CIRCUIT AND METHOD THEREOF

(71) Applicant: Monolithic Power Systems, Inc., San Jose, CA (US)

(72) Inventor: Yan-cun Li, San Jose, CA (US)

(73) Assignee: Monolithic Power Systems, Inc., San Jose, CA (US)

( * ) Notice: Subject to any disclaimer, the term of this patent is extended or adjusted under 35 U.S.C. 154(b) by 0 days.

(21) Appl. No.: 17/356,375

(22) Filed: Jun. 23, 2021

(51) Int. Cl.
| | |
|---|---|
| *H02M 3/335* | (2006.01) |
| *H02M 1/34* | (2007.01) |
| *H02M 1/00* | (2006.01) |
| *H02M 1/32* | (2007.01) |

(52) U.S. Cl.
CPC ......... *H02M 3/33569* (2013.01); *H02M 1/34* (2013.01); *H02M 1/342* (2021.05); *H02M 3/33507* (2013.01); *H02M 3/33523* (2013.01); *H02M 3/33576* (2013.01); *H02M 1/0058* (2021.05); *H02M 1/32* (2013.01)

(58) Field of Classification Search
CPC .... H02M 1/34; H02M 1/342; H02M 3/33576; H02M 1/0058; H02M 1/32; H02M 3/33507–33523; H02M 3/33569–33592
See application file for complete search history.

(56) References Cited

U.S. PATENT DOCUMENTS

| | | | | |
|---|---|---|---|---|
| 6,144,564 | A * | 11/2000 | Fraidlin | H02M 3/33569 |
| | | | | 363/16 |
| 6,768,655 | B1 * | 7/2004 | Yang | H02M 1/4225 |
| | | | | 363/21.01 |
| 7,099,163 | B1 * | 8/2006 | Ying | H02M 3/33523 |
| | | | | 363/49 |
| 7,391,629 | B2 * | 6/2008 | Ryu | H02M 1/32 |
| | | | | 363/21.18 |
| 9,071,142 | B2 * | 6/2015 | Yang | H02M 3/1584 |
| 10,103,616 | B1 * | 10/2018 | Lin | H02M 3/33569 |
| 10,763,752 | B1 * | 9/2020 | Li | H02M 1/08 |
| 11,031,876 | B1 * | 6/2021 | Li | H02M 3/33569 |
| 2006/0050539 | A1 * | 3/2006 | Yang | H02M 3/33523 |
| | | | | 363/21.16 |
| 2013/0114307 | A1 * | 5/2013 | Fang | H02H 7/1213 |
| | | | | 363/21.01 |
| 2013/0147379 | A1 * | 6/2013 | Zhou | H05B 45/00 |
| | | | | 315/210 |
| 2013/0258723 | A1 * | 10/2013 | Fang | H02M 3/33523 |
| | | | | 363/21.17 |

(Continued)

*Primary Examiner* — Yusef A Ahmed
(74) *Attorney, Agent, or Firm* — Perkins Coie LLP

(57) ABSTRACT

An energy recycle circuit for a flyback circuit, the flyback circuit has a primary winding of a transformer a primary switch. The energy recycle circuit has an energy recycle branch coupled in parallel with the primary winding, and an integrated circuit having a plurality of pins. The energy recycle branch has an auxiliary switch and a clamp capacitor connected in series. Among the plurality of pins, a first pin receives an external supply voltage. A second pin is used as a power ground that is different from a primary power ground. A third pin is used to sense a branch current flowing through the energy recycle branch. A fourth pin is used to control an operation of the auxiliary switch. A fifth pin that is connected to an external resistor for setting a maximum ON-time threshold of the auxiliary switch.

13 Claims, 9 Drawing Sheets

(56) References Cited

U.S. PATENT DOCUMENTS

| | | | |
|---|---|---|---|
| 2014/0307484 A1* | 10/2014 | Yang | H02M 3/33569 363/21.12 |
| 2015/0003121 A1* | 1/2015 | Yang | H02M 3/33523 363/21.17 |
| 2016/0087523 A1* | 3/2016 | Liu | H05B 45/375 363/21.12 |
| 2017/0070152 A1* | 3/2017 | Liu | H02M 3/33569 |
| 2018/0069480 A1* | 3/2018 | Koo | H02M 3/33523 |
| 2018/0083543 A1* | 3/2018 | Hara | H02M 3/3385 |
| 2018/0294734 A1* | 10/2018 | Song | H02M 3/33592 |
| 2018/0301975 A1* | 10/2018 | Lin | H02M 1/088 |
| 2019/0036446 A1* | 1/2019 | Yang | H02M 1/34 |
| 2020/0014303 A1* | 1/2020 | Song | H02M 3/33569 |
| 2020/0403521 A1* | 12/2020 | Zheng | H02M 3/33507 |
| 2021/0036506 A1* | 2/2021 | Chen | H02H 7/1213 |
| 2021/0143730 A1* | 5/2021 | Yang | H02M 3/33507 |

* cited by examiner

ENERGY RECYCLE CIRCUIT FOR FLYBACK CIRCUIT AND METHOD THEREOF

TECHNICAL FIELD

The present invention generally relates to electronic circuits, and more particularly but not exclusively, relates to energy recycle circuits for a flyback circuit and methods thereof.

BACKGROUND

Since flyback circuits are widely applied in AC/DC converters, much research have been devoted to eliminate voltage spikes and reduce voltage stress in flyback circuits. Snubber circuits are often employed for their simplicity and low cost.

FIG. 1 shows a conventional RCD snubber 11 for a flyback circuit 100. The RCD snubber 11 comprises a clamp capacitor Csn, a snubber resistor Rsn and a diode Dsn. When a primary control signal GP provided by a primary controller 10 turns OFF a primary switch MP coupled to a primary winding Np, a leakage inductance Lk of a transformer T transfer its leakage inductance energy to charge the clamp capacitor Csn via the diode Dsn. After charging process of the clamp capacitor Csn is over, the energy stored in the clamp capacitor Csn is consumed by the snubber resistor Rsn. Although voltage spikes of the flyback circuit 100 may be well suppressed, efficiency is limited for the leakage inductance energy is just burned out instead of being recycled.

Accordingly, a simple and low-costed solution to recycle the leakage inductance energy is required.

SUMMARY

The embodiments of the present invention are directed to a simple and low-costed solution to recycle the leakage inductance energy.

There has been provided, in accordance with an embodiment of the present invention, an energy recycle circuit for a flyback circuit with a primary winding of a transformer. The energy recycle circuit comprising: an auxiliary switch and a clamp capacitor connected in series to form an energy recycle branch and an integrated circuit having a plurality of pins. Wherein a first pin is configured to receive an external supply voltage. A second pin is coupled to a power ground that is different from a primary power ground. A third pin is configured to sense a branch current flowing through the energy recycle branch. A fourth pin is configured to control a control end of the auxiliary switch, and a fifth pin is coupled to an external resistor for setting a maximum ON-time threshold of the auxiliary switch.

There has been provided, in accordance with another embodiment of the present invention, a method of recycling energy for a flyback circuit, the flyback circuit has a primary winding of a transformer. The method comprises: coupling an energy recycle branch in parallel with the primary winding, wherein the energy recycle branch comprises an auxiliary switch and a clamp capacitor coupled in series; controlling the auxiliary switch via a first pin of a control circuit implemented as an integrated circuit; setting a maximum ON-time threshold of the auxiliary switch by connecting a resistor external to a second pin of the integrated circuit; sensing a branch current flowing through the branch via a third pin of the integrated circuit; turning ON the auxiliary switch in response to detecting the branch current increasing to a first value; starting timing after the auxiliary switch is turned ON; and generating a maximum ON-time control signal when the timing period reaches the maximum ON-time threshold.

There has been provided, in accordance with yet another embodiment of the present invention, a flyback circuit comprising a primary winding of a transformer, a primary switch, an auxiliary switch connected in series with the clamp capacitor to form an energy recycle branch, and an integrated circuit. The primary switch has a first end connected to a first end of the primary winding and a second coupled to a first power ground. A second end of the primary winding is connected to a first end of the clamp capacitor. The energy recycle branch is coupled in parallel with the primary winding. And the integrated circuit comprises a plurality of pins. A first pin is configured to receive an external supply voltage. A second pin is coupled to a second power ground. A third pin is configured to senses a branch current flowing through the branch. A fourth pin is configured to control an operation of the auxiliary switch, and a fifth pin that is coupled to an external resistor for setting a maximum ON-time threshold of the auxiliary switch.

BRIEF DESCRIPTION OF THE DRAWING

The present invention can be further understood with reference to the following detailed description and the appended drawings, wherein like elements are provided with like reference numerals.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Reference to "one embodiment", "an embodiment", "an example" or "examples" means: certain features, structures, or characteristics are contained in at least one embodiment of the present invention. These "one embodiment", "an embodiment", "an example" and "examples" are not necessarily directed to the same embodiment or example. Furthermore, the features, structures, or characteristics may be combined in one or more embodiments or examples. In addition, it should be noted that the drawings are provided for illustration, and are not necessarily to scale. And when an element is described as "connected" or "coupled" to another element, it can be directly connected or coupled to the other element, or there could exist one or more intermediate elements. In contrast, when an element is referred to as "directly connected" or "directly coupled" to another element, there is no intermediate element. When a signal is described as "equal to" another signal, it is substantially identical to the other signal.

Figure 1:
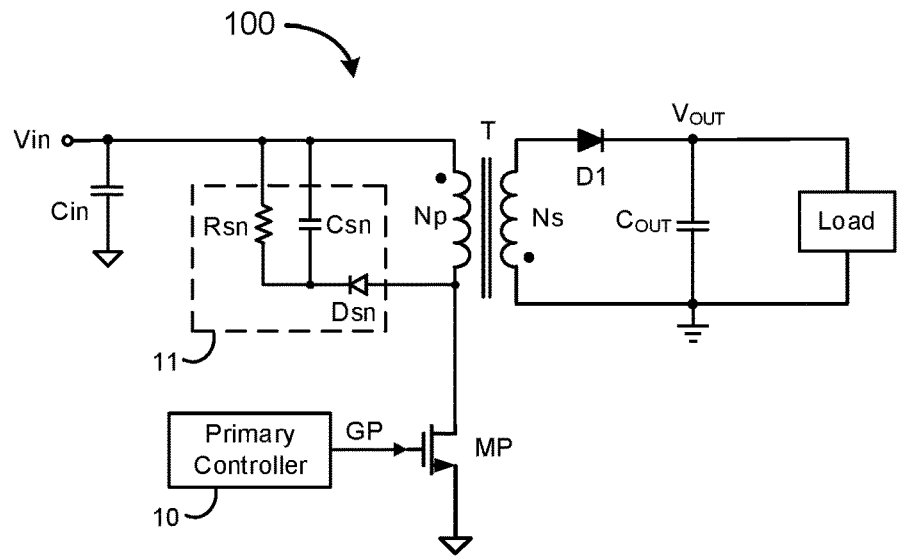
FIG. 1 shows a conventional RCD snubber 11 for a flyback circuit 100.
Figure 2:
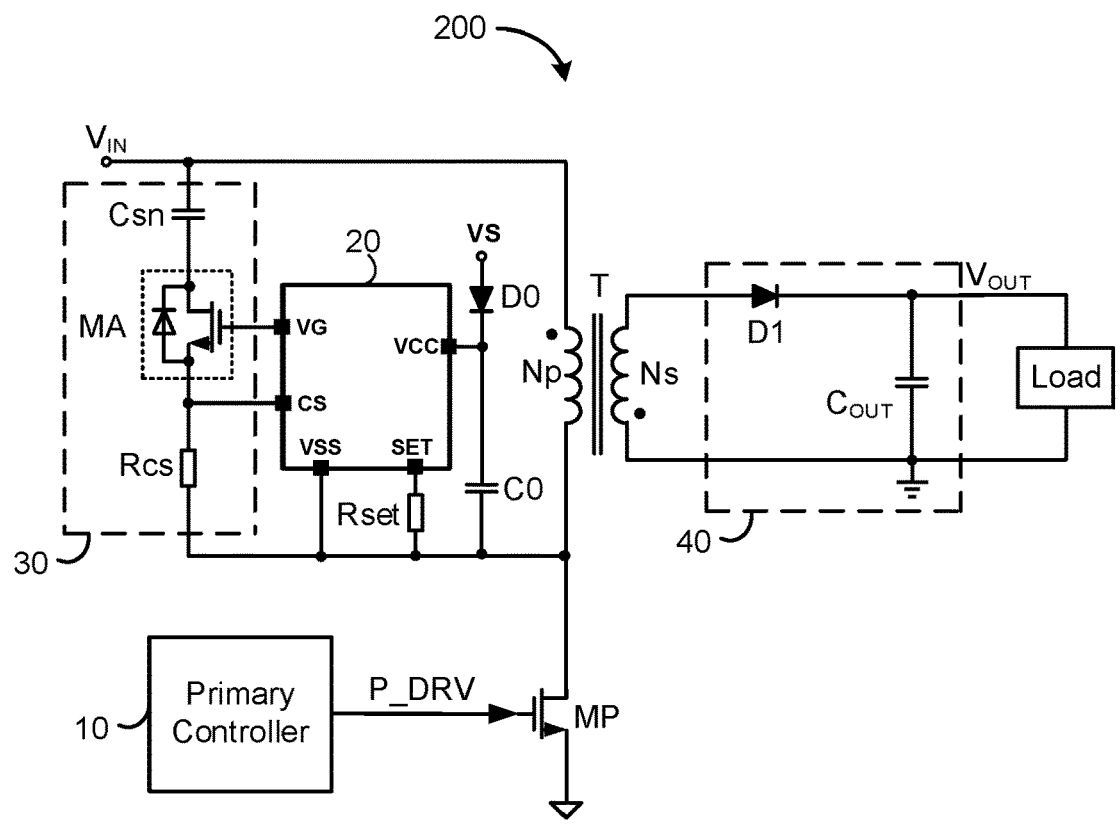
FIG. 2 shows a schematic diagram of a flyback circuit 200 in accordance with an embodiment of the present invention.

FIG. 2 shows a schematic diagram of a flyback circuit 200 in accordance with an embodiment of the present invention. The flyback circuit 200 comprises a transformer T having a primary winding Np and a secondary winding Ns, a primary switch MP, a primary controller 10, a recycle control integrated circuit 20, an energy recycle branch 30 comprising a clamp capacitor Csn and an auxiliary switch MA, and an output circuit 40. The transformer T is coupled to receive an input voltage Vin and generates an output voltage Vout for a load via a rectifier D1 and an output capacitor Cout of the output circuit 40. The primary switch MP is coupled between a first end of the primary winding Np and a primary power ground and is controlled by a primary drive signal P_DRV provided by the primary controller 10.

In the example of FIG. 2, the energy recycle branch 30 is coupled in parallel with the primary winding Np. In detail, a first end of the clamp capacitor Csn is coupled to a second end of the primary winding Np, a second end of the clamp capacitor is coupled to a first end of the auxiliary switch MA. A second end of the auxiliary switch MA is coupled to the first end of the primary winding Np. A control end of the auxiliary switch MA is coupled to a VG pin of the recycle control integrated circuit 20 and is controlled by the recycle control integrated circuit 20 for recycling leakage energy of the transformer T.

In addition, the recycle control integrated circuit 20 further comprises a plurality of pins including a VCC pin, a VSS pin, a CS pin and a SET pin. The VCC pin is coupled to receive an external supply voltage VS via a diode D0 and is coupled to a second power ground via a supply capacitor C0. The VSS pin is coupled to the second power ground that is different from the primary power ground. The CS pin is configured to sense a branch current flowing through the energy recycle branch 30. In the example of FIG. 2, the branch current is sensed through a current sensing resistor Rcs that is inserted and connected in series in the branch 30. In other examples, other suitable ways could also be used to sense the branch current flowing through the branch 30. The SET pin is coupled to an external resistor Rset for setting a maximum ON-time threshold of the auxiliary switch MA. In one embodiment, the maximum ON-time threshold of the auxiliary switch MA is programmable by selecting a resistance of the external resistor Rset. In the example of FIG. 2, the external resistor Rset is arranged outside of the recycle control integrated circuit 20 and is coupled between the SET pin and VSS pin.

Figure 3:
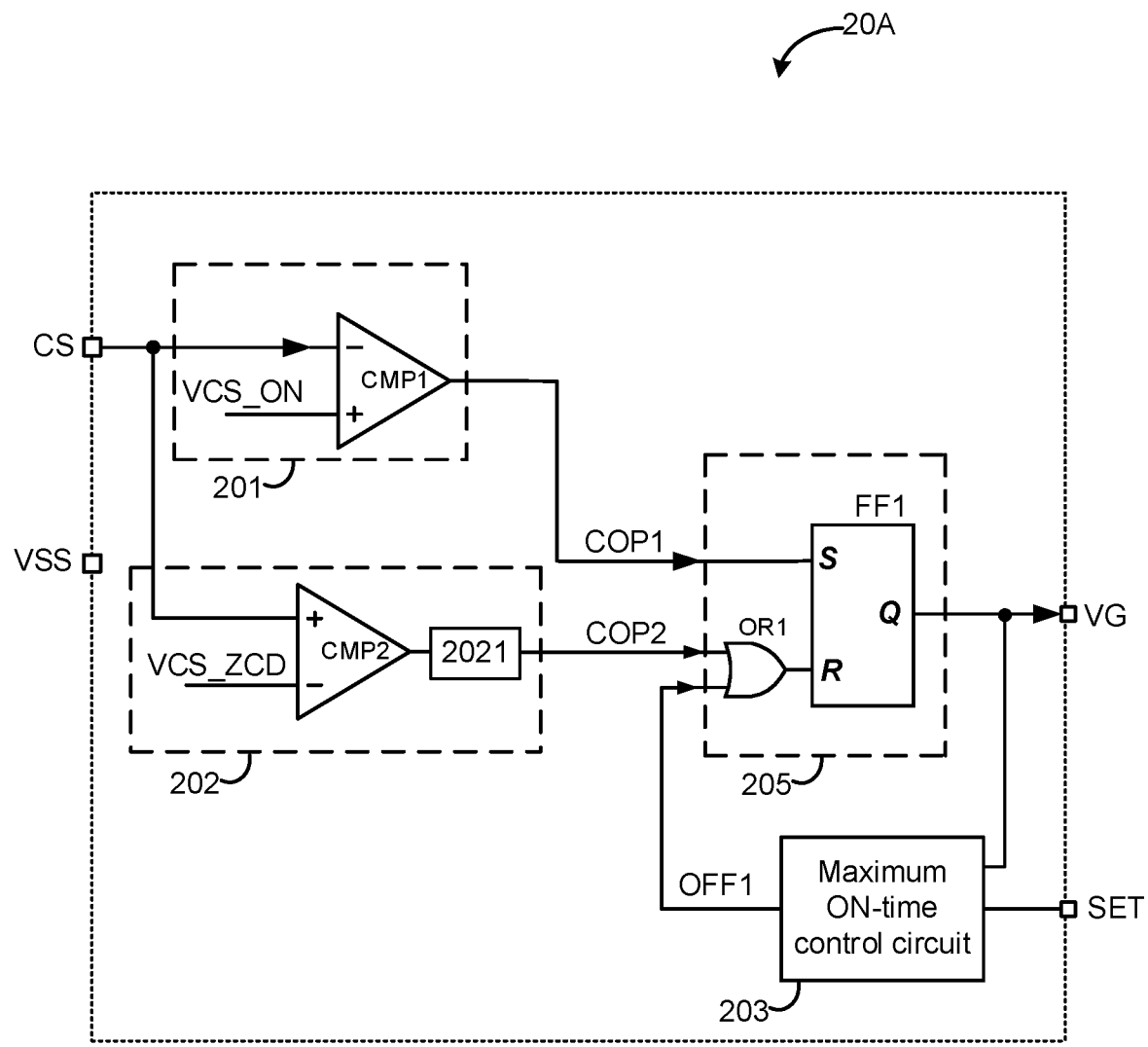
FIG. 3 shows a recycle control integrated circuit 20A used in the flyback circuit 200 shown in FIG. 2 in accordance with an embodiment of the present invention.

FIG. 3 shows a recycle control integrated circuit 20A used in the flyback circuit 200 shown in FIG. 2 in accordance with an embodiment of the present invention.

In one embodiment, the auxiliary switch MA is turned ON in response to detecting the branch current increasing to a first value, and is turned OFF in response to detecting the branch current decreasing to a second value, e.g. 0 A.

In the example of FIG. 3, the recycle control integrated circuit 20A comprises a first comparison circuit 201, a second comparison circuit 202, a maximum ON-time control circuit 203, a logic circuit 205, and a plurality of pins. Pin VCC is configured to receive the power voltage for powering the chip, pin VSS is couple to the second power ground that is different from the primary power ground of the primary controller 10. Pin CS is configured to sense the branch current flowing through the branch 30, pin VG is coupled to the auxiliary switch MA for providing an auxiliary control signal VVG, pin SET is couple to the external resistor Rset for setting the maximum ON-time threshold of the auxiliary switch MA.

In the example of FIG. 3, the first comparison circuit 201 comprises a first comparator CMP1. The first comparator CMP1 has an inverting input terminal, a non-inverting input terminal and an output terminal. Wherein the inverting input terminal is coupled to the CS pin to receive a voltage VCS on the CS pin, the non-inverting terminal is coupled to a turning-ON voltage threshold VCS_ON, the first comparison circuit 201 compares the voltage VCS with the turning-ON voltage threshold VCS_ON and generates a first comparison signal COP1 at the output terminal. In one embodiment, the turning-ON voltage threshold VCS_ON is −20 mV.

The second comparison circuit 202 comprises a second comparator CMP2 and a falling edge one-shot circuit 2021. The second comparator CMP2 has an inverting input terminal, a non-inverting input terminal and an output terminal. Wherein the inverting input terminal is coupled to the CS pin to receive the voltage VCS on the CS pin, the inverting terminal is coupled to a zero-crossing detection threshold VCS_ZCD, the second comparison circuit 202 compares the voltage VCS with a zero-crossing detection threshold VCS_ZCD. The falling edge one-shot circuit 2021 has an input terminal coupled to the output terminal of the second comparator CMP2 and generates a falling edge pulse signal as a second comparison signal COP2 at an output terminal. In one embodiment, the zero-crossing detection threshold VCS_ZCD is 20 mV. Only when the output of the second comparator 202 is from high to low, the falling edge one-shot circuit 2021 provides the second comparison signal COP2 with a single pulse.

The maximum ON-time control circuit 203 has a first input terminal coupled to the VG pin, a second input terminal coupled to the SET pin and an output terminal. The maximum ON-time control circuit 203 generates a maximum ON-time control signal OFF1 at the output terminal when the time period after the auxiliary switch MA is turned ON reaches the maximum ON-time threshold.

The logic circuit 205 has a first input terminal, a second input terminal, a third input terminal and an output terminal. Wherein the first input terminal is coupled to the output terminal of the first comparison circuit 201 to receive the first comparison signal COP1, the second input terminal is coupled to the output terminal of the second comparison circuit 202 to receive the second comparison signal COP2, and the third input terminal is coupled to the output terminal of the maximum ON-time control circuit 203 to receive the maximum ON-time control signal OFF1. The logic circuit 205 turns ON the auxiliary switch MA based on the first comparison signal COP1, and turns OFF the auxiliary switch MA based on the second comparison signal COP2 or the maximum ON-time control signal OFF1.

In the example of FIG. 3, the logic circuit 205 comprises an OR gate circuit OR1 and a RS flip-flop FF1. The OR gate circuit OR1 has a first input terminal that is configured to receive the second comparison signal COP2, a second input terminal that is configured to receive the maximum ON-time control signal OFF1, and an output terminal. The RS flip-flop FF1 ha a set terminal that is coupled to the first comparison circuit 201 to receive the first comparison signal COP1, a reset terminal that is coupled to the output terminal of the OR gate circuit OR1, and an output terminal that is coupled to the VG pin.

Figure 4:
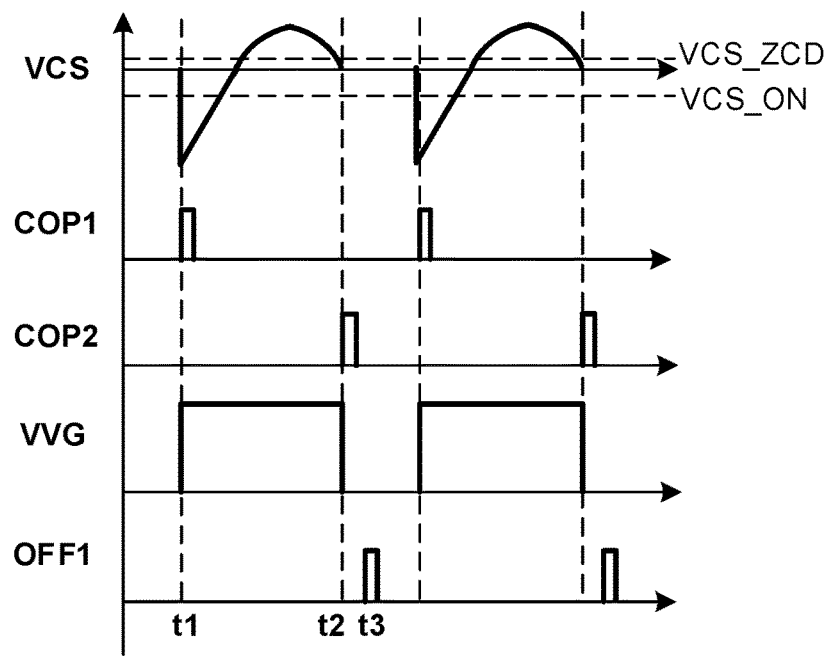
FIG. 4 shows working waveforms of the recycle control integrated circuit 20A shown in FIG. 3 in accordance with an embodiment of the present invention.

FIG. 4 shows working waveforms of the recycle control integrated circuit 20A shown in FIG. 3 in accordance with an embodiment of the present invention.

As shown in FIG. 4, at time t1, the voltage VCS on the CS pin is less than the turning-ON voltage threshold VCS_ON, the first comparison signal COP1 at the set terminal of the RS flip-flop FF1 becomes high. Accordingly, the auxiliary control signal VVG becomes high from low to turn ON the auxiliary switch MA.

At time t2, the voltage VCS on the CS pin is decreased to the zero-crossing detection threshold VCS_ZCD, e.g. 20 mV, the output of the second comparator CMP2 is from high to low, and the falling edge one-shot circuit 2021 is triggered to output a single pulse as the second comparison signal COP2, and the OR gate circuit OR1 also provides a single pulse to trigger the reset terminal of the RS flip-flop FF1. Accordingly, the auxiliary control signal VVG becomes low from high to turn OFF the auxiliary switch MA.

The maximum ON time control circuit 203 starts timing when the auxiliary switch MA is turned ON. At time t3, the timing period after the auxiliary switch MA is turned ON reaches the maximum ON-time threshold, the maximum ON-time control circuit 203 generates the maximum ON-time control signal OFF1 with high level. Under some conditions, the auxiliary switch MA might still keep ON state if the zero-crossing point is not detected, the maximum ON time control signal OFF1 will be configured to turn OFF the auxiliary switch MA, to guarantee the maximum ON-time of the auxiliary switch not exceeding the maximum ON-time threshold.

Figure 5:
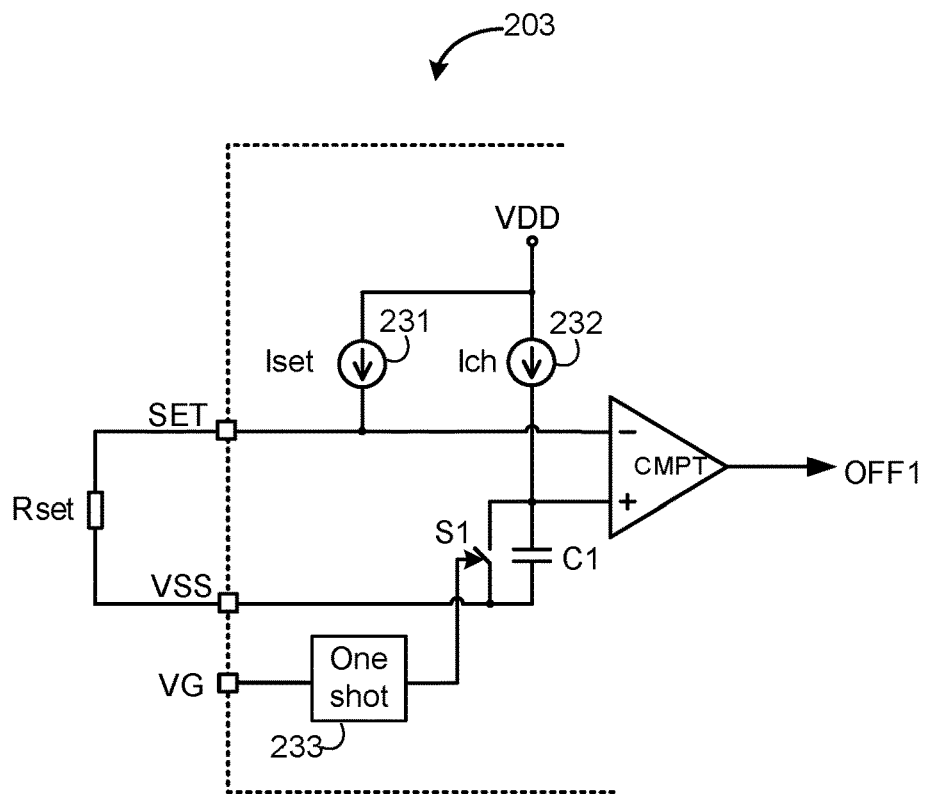
FIG. 5 shows a maximum ON-time control circuit 203A for the integrated circuit 20A shown in FIG. 3 in accordance with an embodiment of the present invention.

FIG. 5 shows a maximum ON-time control circuit 203A for the integrated circuit 20A shown in FIG. 3 in accordance with an embodiment of the present invention.

In the example of FIG. 5, the maximum ON-time control circuit 203 comprises a first current source 231, a second current source 232, a first capacitor C1, a first transistor S1 and a comparison circuit CMPT. The first current source 231 has a first terminal that is coupled to receive an internal supply voltage VDD and a second terminal that is coupled to the SET pin. The first current source 231 provides a first current Iset at the second terminal. The external resistor Rset is arranged outside of the integrated circuit 20A and is coupled between the SET pin and the VSS pin. The second current source 232 has a first terminal coupled to the VCC pin and a second terminal, wherein the second current source 232 provides a second current Ich at the second terminal, and the second current Ich is proportional to the first current Iset. The first capacitor C1 has a first terminal and a second terminal, wherein the first terminal is coupled to the second terminal of the second current source 232, the second terminal is coupled to the VSS pin. The first transistor S1 has a first terminal, a second terminal and a control terminal, wherein the first terminal is coupled to the first terminal of the first capacitor C1, the second terminal is coupled to the VSS pin, and the control terminal is coupled to the VG pin through a one-shot circuit 233. The comparison circuit CMPT has an inverting input terminal, a non-inverting input terminal and an output terminal, wherein the inverting input terminal is coupled to the SET pin, the non-inverting input terminal is coupled to the first terminal of the first capacitor C1, and the comparison circuit CMPT generates the maximum ON-time control signal OFF1 at the output terminal.

Figure 6:
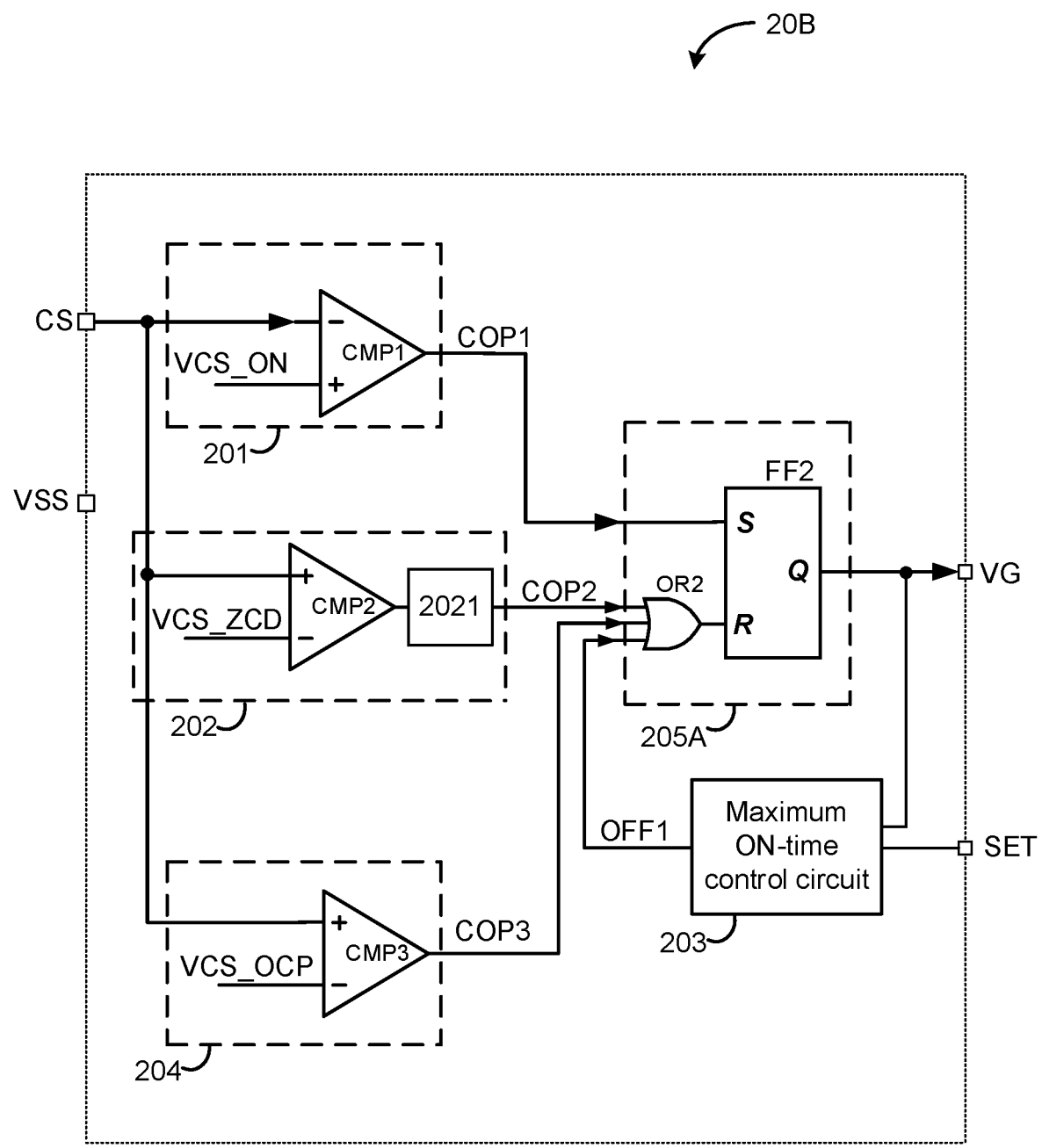
FIG. 6 shows an integrated circuit 20B used in the flyback circuit 200 shown in FIG. 2 in accordance with another embodiment of the present invention.

FIG. 6 shows an integrated circuit 20B used in the flyback circuit 200 shown in FIG. 2 in accordance with another embodiment of the present invention.

In the example of FIG. 6, compared with the integrated circuit 20A shown in FIG. 3, the integrated circuit 20B further comprises a third comparison circuit 204 and a logic circuit 205A instead of the logic circuit 205 shown in FIG. 3.

The third comparison circuit 204 comprises a third comparator CMP3. The third comparator CMP3 has an inverting input terminal, a non-inverting input terminal and an output terminal, wherein the non-inverting input terminal is coupled to the CS pin to receive the voltage VCS on the CS pin, the inverting terminal is coupled to an over-current threshold VCS_OCP. The third comparison circuit 204 compares the voltage VCS with the over-current threshold VCS_OCP and generates a third comparison signal COP3. In one embodiment, the over-current threshold VCS_OCP is 0.8V.

The logic circuit 205A has a first input terminal, a second input terminal, a third input terminal, a fourth input terminal and an output terminal. The first input terminal is coupled to the output terminal of the first comparison circuit 201 to receive the first comparison signal COP1. The second input terminal is coupled to the output terminal of the second comparison circuit 202 to receive the second comparison signal COP2 with a single pulse. The third input terminal is coupled to the output terminal of the maximum ON-time control circuit 203 to receive the maximum ON-time control signal OFF1. The fourth input terminal is coupled to the output terminal of the third comparison circuit 204. The logic circuit 205A turns ON the auxiliary switch MA based on the first comparison signal COP1, and turns OFF the auxiliary switch MA based on the second comparison signal COP2, the third comparison signal COP3 or the maximum ON-time control signal OFF1.

In the example of FIG. 6, the logic circuit 205A comprises an OR gate circuit OR2 and a RS flip-flop FF2. The OR gate circuit OR2 has a first input terminal that is configured to receive the second comparison signal COP2, a second input terminal that is configured to receive the maximum ON-time control signal OFF1, a third input terminal that is configured to receive the third compassion signal COP3, and an output terminal. The RS flip-flop FF2 ha a set terminal that is coupled to the first comparison circuit 201 to receive the first comparison signal COP1, a reset terminal that is coupled to the output terminal of the OR gate circuit OR2, and an output terminal that is coupled to the VG pin.

Figure 7:
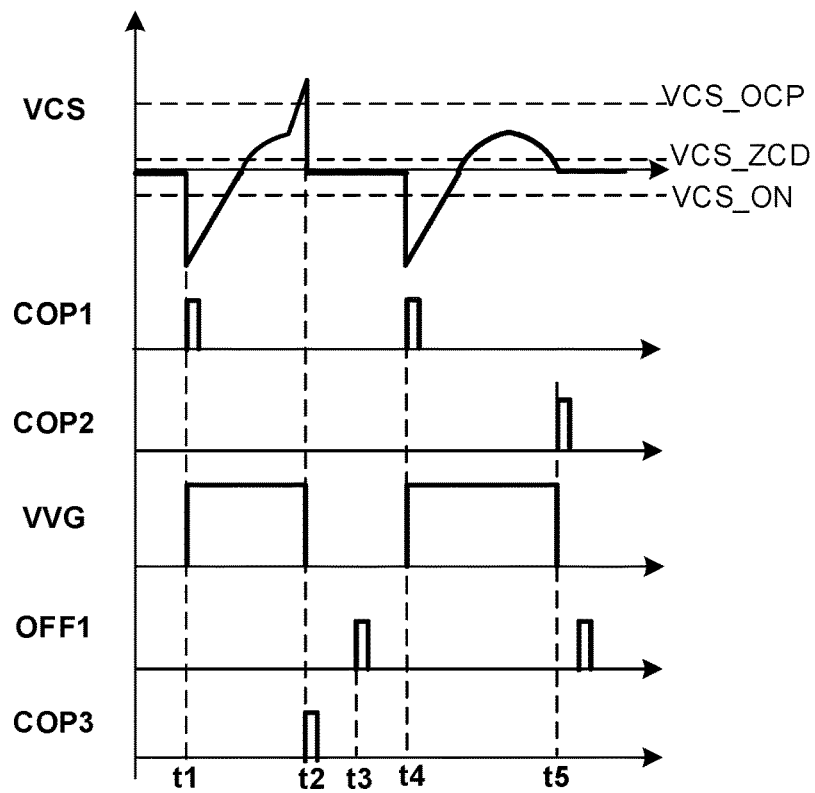
FIG. 7 shows working waveforms of the recycle control integrated circuit 20B shown in FIG. 6 in accordance with an embodiment of the present invention.

FIG. 7 shows working waveforms of the recycle control integrated circuit 20B shown in FIG. 6 in accordance with an embodiment of the present invention.

As shown in FIG. 7, at time t1, the voltage VCS on the CS pin is less than the turning-ON voltage threshold VCS_ON, the first comparison signal COP1 at the set terminal of the RS flip-flop FF2 becomes high. Accordingly, the auxiliary control signal VVG becomes high from low to turn ON the auxiliary switch MA.

At time t2, the voltage VCS on the CS pin is increased to the over-current threshold VCS_OCP, e.g. 0.8V, the third comparison signal COP3 becomes high, the output signal at the output terminal of the OR gate circuit OR2 also becomes high. Accordingly, the auxiliary control signal VVG becomes low from high to turn OFF the auxiliary switch MA.

The maximum ON time control circuit 203 starts timing when the auxiliary switch MA is turned ON. At time t3, the maximum ON time control circuit 203 generates the maximum ON-time control signal OFF1 with high level when the timing period after the auxiliary switch is turned ON reaches the maximum ON-time threshold, to guarantee the maximum ON-time of the auxiliary switch not exceeding the maximum ON-time threshold.

At time t4, the voltage VCS on the CS pin is less than the turning-ON voltage threshold VCS_ON again, the first comparison signal COP1 becomes high, the first comparison signal COP1 at the set terminal of the RS flip-flop FF2 becomes high. Accordingly, the auxiliary control signal VVG becomes high from low to turn ON the auxiliary switch MA.

At time t5, the voltage VCS on the CS pin is decreased to the zero-crossing detection threshold VCS_ZCD, e.g. 20 mV, the output of the second comparator CMP2 is from high to low, and the falling edge one-shot circuit 2021 is triggered to output a single pulse as the second comparison signal COP2, and the OR gate circuit OR2 also provides a single pulse to trigger the reset terminal of the RS flip-flop FF2. Accordingly, the auxiliary control signal VVG becomes low from high to turn OFF the auxiliary switch MA.

Figure 8A:
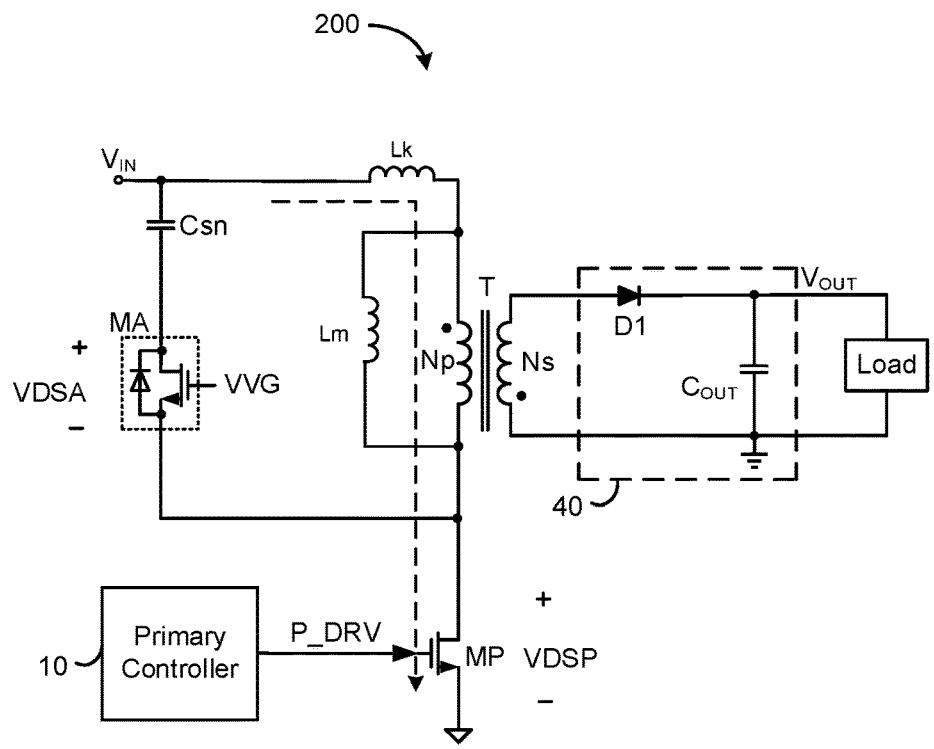
FIG. 8a-FIG. 8c respectively shows three states of a current flow of the flyback circuit 200 in accordance with an embodiment of the present invention.
Figure 8B:
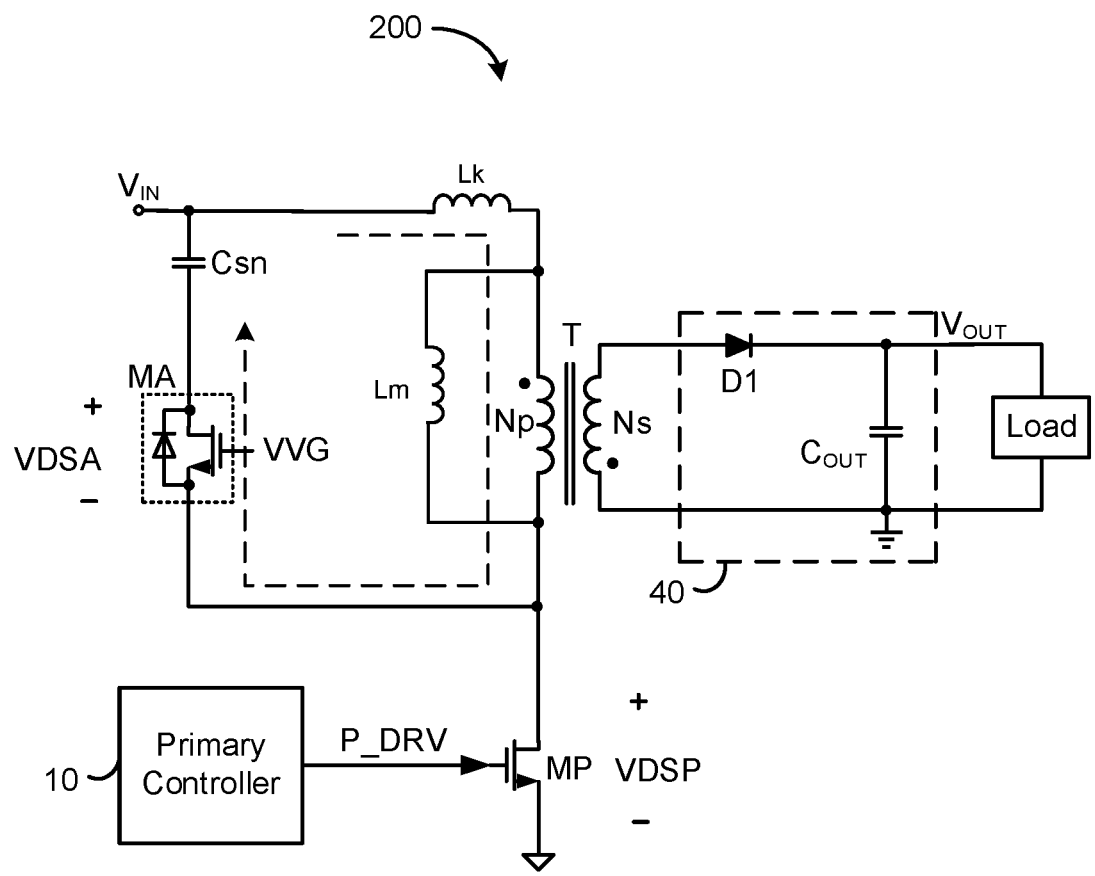
Figure 8C:
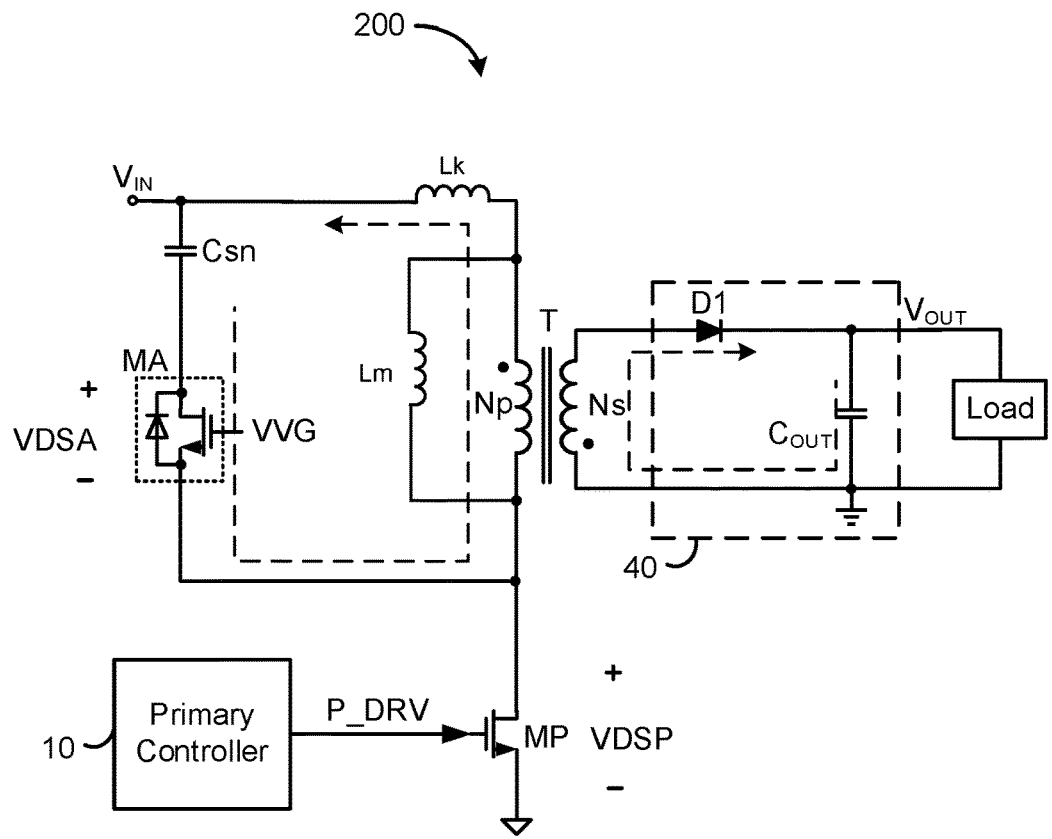
Figure 9:
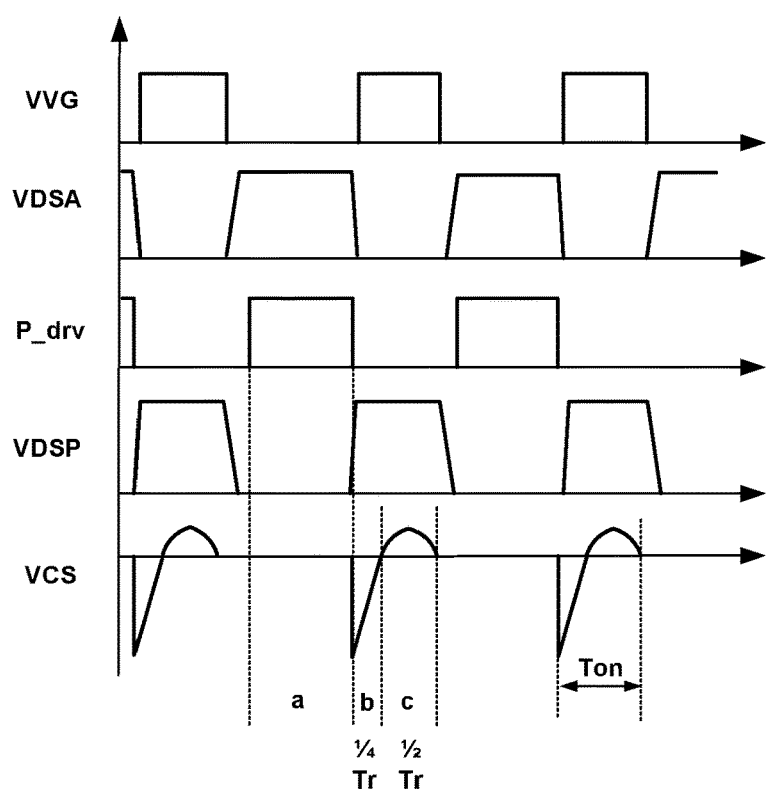
FIG. 9 shows working waveforms of four states shown in FIG. 8a-FIG. 8c in accordance with an embodiment of the present invention.

FIG. 8a-FIG. 8c respectively shows three states of a current flow of the flyback circuit 200 in accordance with an embodiment of the present invention. FIG. 9 shows working waveforms of four states shown in FIG. 8a~FIG. 8c in accordance with an embodiment of the present invention.

Referring to FIG. 8a and state a shown in FIG. 9, the primary switch MP is in ON state and the auxiliary switch is in OFF state. The current through the primary winding Np and the primary switch MP. Therefore, the energy is stored in the transformer T and the leakage inductance Lk. The leakage inductance Lk of the transformer T and a capacitance of the clamp capacitor Csn generates a resonance, to generate a resonant period Tr.

Referring to FIG. 8b and state b (a first ¼Tr) shown in FIG. 9, the primary switch MP is turned OFF, the leakage inductance Lk of the transformer T has to transfer its energy to the clamp capacitor Csn and the secondary side output. So a current flows from the primary winding Np and through a body diode of the auxiliary switch MA to charge the clamp capacitor Csn. Shortly, the auxiliary switch MA is turned ON as soon as the current flows through the body diode of the auxiliary switch MA.

Referring to FIG. 8c and state c (a ½Tr) shown in FIG. 9, the energy stored in the clamp capacitor Csn will be released to the secondary side output through transformer T and the leakage inductance Lk via the auxiliary switch MA. Finally, the energy stored in the leakage inductance Lk is fully released to the secondary side outputs.

Accordingly, the maximum ON-time is consisted of three quarters of the resonant period Tr.

The recycle control integrated circuit of the present invention can be flexibly used to work with any primary controller to form a flyback circuit and improve reliability of the flyback circuit.

Figure 10:
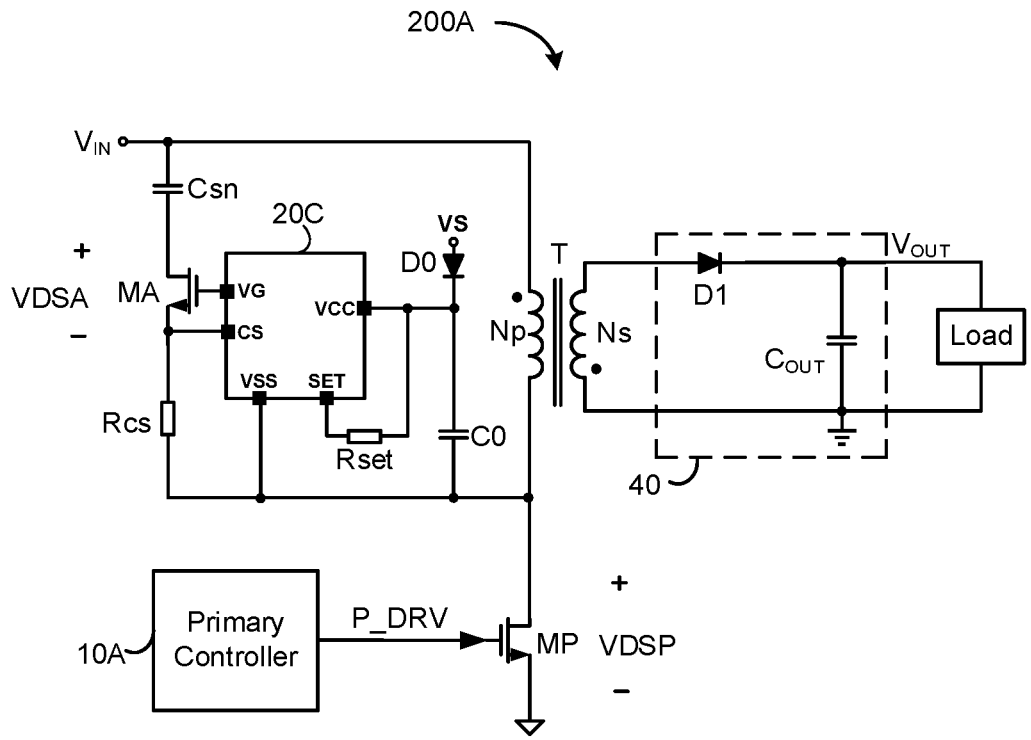
FIG. 10 shows a schematic diagram of a flyback circuit 200A in accordance with another embodiment of the present invention.

FIG. 10 shows a schematic diagram of a flyback circuit 200A in accordance with another embodiment of the present invention. The flyback circuit 200A comprises a transformer T having a primary winding Np and a secondary winding Ns, a primary switch MP, a primary controller 10A, a recycle control integrated circuit 20C, an energy recycle branch comprising a clamp capacitor Csn and an auxiliary switch MA, and an output circuit 40. The primary switch MP is controlled by a primary drive signal P_DRV provided by the primary controller 10A.

A control end of the auxiliary switch MA is coupled to a VG pin of the recycle control integrated circuit 20C and is controlled by the recycle control integrated circuit 20C for recycling leakage energy of the transformer T.

In addition, the recycle control integrated circuit 20C further comprises a plurality of pins including a VCC pin, a VSS pin, a CS pin and a SET pin. The VCC pin is coupled to receive an external power voltage VS via a diode D0 and is coupled to a second power ground via a supply capacitor C0. The VSS pin is coupled to the second power ground that is different from the primary power ground. The CS pin is configured to sense a branch current flowing through the energy recycle branch. In the example of FIG. 10, the branch current is sensed through a current sensing resistor Rcs that is inserted and connected in series in the branch. The SET pin is coupled to an external resistor Rset for setting a maximum ON-time threshold of the auxiliary switch MA. In the example of FIG. 10, the external resistor Rset is arranged outside of the recycle control integrated circuit 20 and is coupled between the SET pin and VCC pin.

Figure 11:
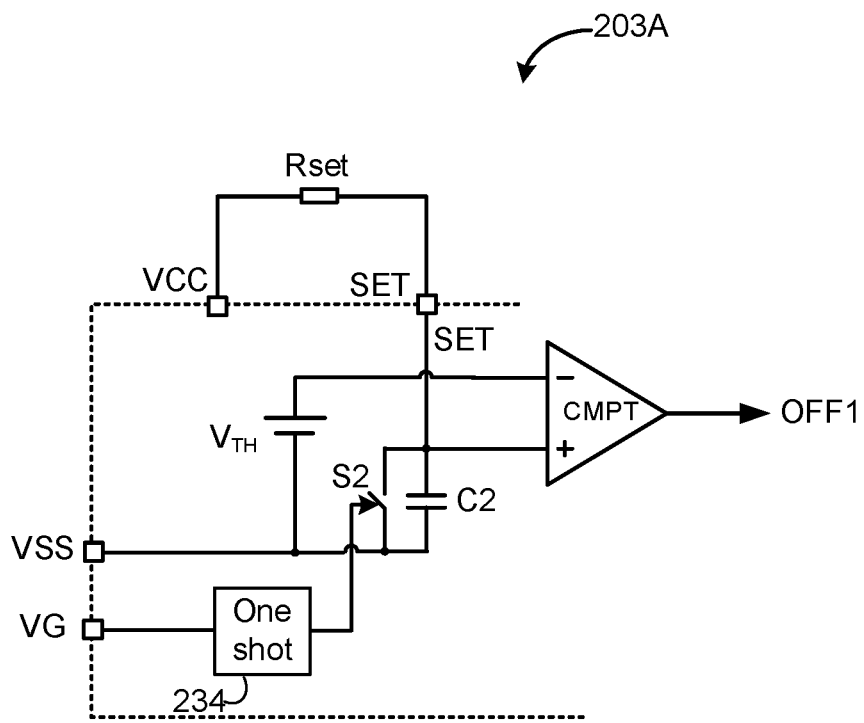
FIG. 11 shows a maximum ON-time control circuit 203C for the recycle control integrated circuit 20C shown in FIG. 10 in accordance with an embodiment of the present invention.

FIG. 11 shows a maximum ON-time control circuit 203C for the recycle control integrated circuit 20C shown in FIG. 10 in accordance with an embodiment of the present invention.

In the example of FIG. 11, the maximum ON-time control circuit 203A comprises a second capacitor C1, a second transistor S2 and a comparison circuit CMPT. The external resistor Rset is arranged outside of the integrated circuit 20C and is coupled between the SET pin and the VCC pin. The second capacitor C1 has a first terminal coupled to the SET pin and a second terminal coupled to the VSS pin. The first transistor S1 has a first terminal, a second terminal and a control terminal, wherein the first terminal is coupled to the first terminal of the first capacitor C1, the second terminal is coupled to the VSS pin, and the control terminal is coupled to the VG pin through a second one-shot circuit 234. The comparison circuit CMPT has an inverting input terminal, a non-inverting input terminal and an output terminal, wherein the inverting input terminal is coupled to receive a reference voltage Vth, the non-inverting input terminal is coupled to the first terminal of the second capacitor C2. The comparison circuit CMPT generates the maximum ON-time control signal OFF1 at the output terminal.

Figure 12:
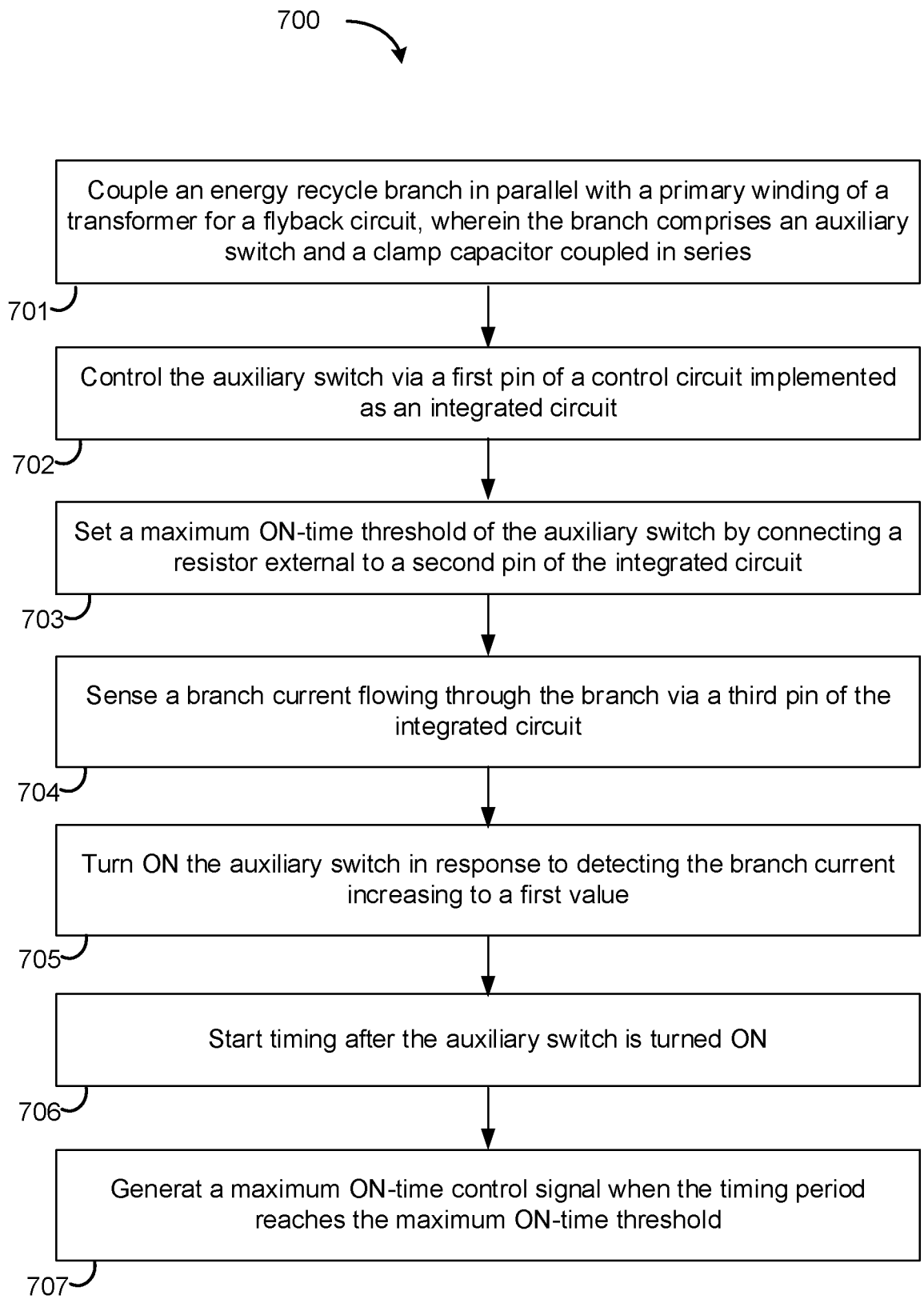
FIG. 12 shows a flow diagram of a method 700 of recycling energy for a flyback circuit in accordance with an embodiment of the present invention.

FIG. 12 shows a flow diagram of a method 700 of recycling energy for a flyback circuit in accordance with an embodiment of the present invention.

In the example of FIG. 12, the flyback circuit has a primary winding of a transformer. The method comprises steps 701~701. An energy recycle branch is coupled in parallel with the primary winding, wherein the energy recycle branch comprises an auxiliary switch and a clamp capacitor coupled in series (step 701). The auxiliary switch is controlled via a first pin of a control circuit implemented as an integrated circuit (step 702). An external resistor is arranged outside of the integrated circuit and is connected to a second pin of the integrated circuit for setting a maximum ON-time threshold (step 703). A branch current flowing through the branch is sensed via a third pin of the integrated circuit (step 704). The auxiliary switch is turned ON in response to detecting the branch current increasing to a first value (step 705). And a timer starts timing after the auxiliary switch is turned ON (step 706). A maximum ON-time control signal is generated when time period reaches the maximum ON-time threshold (step 707).

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The operation steps may be interchanged in any order without departing from the scope of the invention as long as such an interchange does not contradict the claim language and is not logically nonsensical.

Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

What is claimed is:

1. An energy recycle circuit for a flyback circuit with a primary winding of a transformer, the energy recycle circuit comprising:
   an auxiliary switch and a clamp capacitor connected in series to form an energy recycle branch, wherein a first end of the clamp capacitor is coupled to a first end of the primary winding, a second end of the clamp capacitor is coupled to a first end of the auxiliary switch, a second end of the auxiliary switch is coupled to a second end of the primary winding; and
   an integrated circuit having a first pin that is configured to receive an external supply voltage, a second pin that is coupled to a power ground, a third pin that is configured to sense a branch current flowing through the energy recycle branch, a fourth pin that is coupled to a control end of the auxiliary switch, and a fifth pin that is coupled to an external resistor for setting a maximum ON-time threshold of the auxiliary switch;
   wherein the auxiliary switch is turned ON in response to detecting the branch current increasing to a first value, and is turned OFF in response to detecting the branch current decreasing to a second value, wherein the first value is less than the second value;
   wherein the integrated circuit further comprising:
   a first comparison circuit coupled to the third pin, wherein the first comparison circuit compares a voltage on the third pin with a first voltage threshold and generates a first comparison signal;
   a second comparison circuit coupled to the third pin, wherein the second comparison circuit compares the voltage on the third pin with a second voltage threshold and generates a second comparison signal;
   a maximum ON-time control circuit coupled to the fourth pin and the fifth pin, wherein the maximum ON-time control circuit generates a maximum ON-time control signal when a time period after the auxiliary switch is turned ON reaches the maximum ON-time threshold; and
   a logic circuit coupled to the first comparison circuit, the second comparison circuit and the maximum ON-time control circuit, wherein the logic circuit turns ON the auxiliary switch based on the first comparison signal, and turns OFF the auxiliary switch based on the second comparison signal or the maximum ON-time control signal; and
   wherein the maximum ON-time control circuit comprising:
   a first current source having a first terminal that is coupled to a supply voltage and a second terminal that is coupled to the fifth pin, wherein the first current source provides a first current at the second terminal, the external resistor is arranged outside of the integrated circuit and is coupled between the second pin and the fifth pin;
   a second current source having a first terminal coupled to the supply voltage and a second terminal, wherein the second current source provides a second current at the second terminal, and the second current is proportional to the first current;
   a first capacitor having a first terminal and a second terminal, wherein the first terminal is coupled to the second terminal of the second current source, the second terminal is coupled to the second pin;
   a first transistor having a first terminal, a second terminal and a control terminal, wherein the first terminal is coupled to the first terminal of the first capacitor, the second terminal is coupled to the second pin, and the control terminal is coupled to the fourth pin through a one-shot circuit; and
   a third comparison circuit having a first input terminal, a second input terminal and an output terminal, wherein the first input terminal is coupled to the fifth pin, the second input terminal is coupled to the first terminal of the first capacitor, and the third comparison circuit generates the maximum ON-time control signal at the output terminal.

2. The energy recycle circuit of claim 1, wherein the maximum ON-time threshold of the auxiliary switch is programmable by selecting a resistance of the external resistor.

3. The energy recycle circuit of claim 1, wherein the maximum ON-time threshold of the auxiliary switch is three quarters of a resonant period, and a leakage inductance of the transformer and a capacitance of the clamp capacitor generates a resonance, to generate the resonant period.

4. The energy recycle circuit of claim 1, wherein the logic circuit comprises:
an OR gate circuit having a first input terminal that is configured to receive the second comparison signal, a second input terminal that is configured to receive the maximum ON-time control signal, and an output terminal;
a RS flip-flop having a set terminal that is coupled to the first comparison circuit to receive the first comparison signal, a reset terminal that is coupled to the output terminal of the OR gate circuit, and an output terminal that is coupled to the fourth pin.

5. A method of recycling energy for a flyback circuit, the flyback circuit has a primary winding of a transformer, the method comprising:
coupling an energy recycle branch in parallel with the primary winding, wherein the energy recycle branch comprises an auxiliary switch and a clamp capacitor coupled in series;
controlling the auxiliary switch via a first pin of a control circuit implemented as an integrated circuit;
setting a maximum ON-time threshold of the auxiliary switch by connecting a resistor external to a second pin of the integrated circuit;
sensing a branch current flowing through the branch via a third pin of the integrated circuit;
turning ON the auxiliary switch in response to detecting the branch current increasing to a first value;
starting timing after the auxiliary switch is turned ON; and
generating a maximum ON-time control signal when a timing period reaches the maximum ON-time threshold;
wherein the auxiliary switch is turned OFF in response to detecting the branch current decreasing to a second value, wherein the first value is less than the second value;
wherein the integrated circuit further comprising:
a first comparison circuit coupled to the third pin, wherein the first comparison circuit compares a voltage on the third pin with a first voltage threshold and generates a first comparison signal;
a second comparison circuit coupled to the third pin, wherein the second comparison circuit compares the voltage on the third pin with a second voltage threshold and generates a second comparison signal;
a maximum ON-time control circuit coupled to the first pin and the second pin, wherein the maximum ON-time control circuit generates the maximum ON-time control signal when the timing period after the auxiliary switch is turned ON reaches the maximum ON-time threshold; and
a logic circuit coupled to the first comparison circuit, the second comparison circuit and the maximum ON-time control circuit, wherein the logic circuit turns ON the auxiliary switch based on the first comparison signal, and turns OFF the auxiliary switch based on the second comparison signal or the maximum ON-time control signal; and
wherein the maximum ON-time control circuit comprising:
a first current source having a first terminal that is coupled to a supply voltage and a second terminal that is coupled to the second pin, wherein the first current source provides a first current at the second terminal, the resistor is arranged outside of the integrated circuit and is coupled between a fourth pin and the second pin;
a second current source having a first terminal coupled to the supply voltage and a second terminal, wherein the second current source provides a second current at the second terminal, and the second current is proportional to the first current;
a first capacitor having a first terminal and a second terminal, wherein the first terminal is coupled to the second terminal of the second current source, the second terminal is coupled to the fourth pin;
a first transistor having a first terminal, a second terminal and a control terminal, wherein the first terminal is coupled to the first terminal of the first capacitor, the second terminal is coupled to the fourth pin, and the control terminal is coupled to the first pin through a one-shot circuit; and
a third comparison circuit having a first input terminal, a second input terminal and an output terminal, wherein the first input terminal is coupled to the second pin, the second input terminal is coupled to the first terminal of the first capacitor, and the third comparison circuit generates the maximum ON-time control signal at the output terminal.

6. The method of claim 5, wherein the maximum ON-time threshold of the auxiliary switch is programmable by selecting a resistance of the resistor.

7. The method of claim 5, wherein the maximum ON-time threshold of the auxiliary switch is three quarters of a resonant period, and a leakage inductance of the transformer and a capacitance of the clamp capacitor generates a resonance, to generate the resonant period.

8. The method of claim 5, further comprises turning OFF the auxiliary switch in response to detecting the branch current decreasing to zero.

9. The method of claim 8, further comprises turning OFF the auxiliary switch in response to detecting the branch current increasing to an overcurrent threshold.

10. A flyback circuit, comprising:
a primary winding of a transformer;
a primary switch having a first end that is connected to a first end of the primary winding and a second end that is coupled to a first power ground, a second end of the primary winding is connected to a first end of a clamp capacitor;
an auxiliary switch connected in series with the clamp capacitor to form an energy recycle branch that is coupled in parallel with the primary winding; and
an integrated circuit having a first pin that is configured to receive an external supply voltage, a second pin that is coupled to a second power ground, a third pin that is configured to senses a branch current flowing through the branch, a fourth pin that is configured to control an operation of the auxiliary switch, and a fifth pin that is coupled to an external resistor for setting a maximum ON-time threshold of the auxiliary switch;
wherein the auxiliary switch is turned ON in response to detecting the branch current increasing to a first value, and is turned OFF in response to detecting the branch current decreasing to a second value, wherein the first value is less than the second value;
wherein the integrated circuit further comprising:
a first comparison circuit coupled to the third pin, wherein the first comparison circuit compares a voltage on the third pin with a first voltage threshold and generates a first comparison signal;

a second comparison circuit coupled to the third pin, wherein the second comparison circuit compares the voltage on the third pin with a second voltage threshold and generates a second comparison signal;

a maximum ON-time control circuit coupled to the fifth pin and the fourth pin, wherein the maximum ON-time control circuit generates a maximum ON-time control signal when a time period after the auxiliary switch is turned ON reaches the maximum ON-time threshold; and a logic circuit coupled to the first comparison circuit, the second comparison circuit and the maximum ON-time control circuit, wherein the logic circuit turns ON the auxiliary switch based on the first comparison signal, and turns OFF the auxiliary switch based on the second comparison signal or the maximum ON-time control signal; and wherein the maximum ON-time control circuit comprising:

a first current source having a first terminal that is coupled to a supply voltage and a second terminal that is coupled to the fifth pin, wherein the first current source provides a first current at the second terminal, the external resistor is arranged outside of the integrated circuit and is coupled between the second pin and the fifth pin;

a second current source having a first terminal coupled to the supply voltage and a second terminal, wherein the second current source provides a second current at the second terminal, and the second current is proportional to the first current;

a first capacitor having a first terminal and a second terminal, wherein the first terminal is coupled to the second terminal of the second current source, the second terminal is coupled to the second pin;

a first transistor having a first terminal, a second terminal and a control terminal, wherein the first terminal is coupled to the first terminal of the first capacitor, the second terminal is coupled to the second pin, and the control terminal is coupled to the fourth pin through a one-shot circuit; and a third comparison circuit having a first input terminal, a second input terminal and an output terminal, wherein the first input terminal is coupled to the fifth pin, the second input terminal is coupled to the first terminal of the first capacitor, and the third comparison circuit generates the maximum ON-time control signal at the output terminal.

11. The flyback circuit of claim 10, wherein the maximum ON-time threshold of the auxiliary switch is programmable by selecting a resistance of the external resistor.

12. The flyback circuit of claim 10, wherein the maximum ON-time threshold of the auxiliary switch is three quarters of a resonant period, and a leakage inductance of the transformer and a capacitance of the clamp capacitor generates a resonance, to generate the resonant period.

13. An energy recycle circuit for a flyback circuit with a primary winding of a transformer, the energy recycle circuit comprising:

an auxiliary switch and a clamp capacitor connected in series to form an energy recycle branch, wherein a first end of the clamp capacitor is coupled to a first end of the primary winding, a second end of the clamp capacitor is coupled to a first end of the auxiliary switch, a second end of the auxiliary switch is coupled to a second end of the primary winding; and an integrated circuit having a first pin that is configured to receive an external supply voltage, a second pin that is coupled to a power ground, a third pin that is configured to sense a branch current flowing through the energy recycle branch, a fourth pin that is coupled to a control end of the auxiliary switch, and a fifth pin that is coupled to an external resistor for setting a maximum ON-time threshold of the auxiliary switch;

wherein the auxiliary switch is turned ON in response to detecting the branch current increasing to a first value, and is turned OFF in response to detecting the branch current decreasing to a second value, wherein the first value is less than the second value;

wherein the integrated circuit further comprising:

a first comparison circuit coupled to the third pin, wherein the first comparison circuit compares a voltage on the third pin with a first voltage threshold and generates a first comparison signal;

a second comparison circuit coupled to the third pin, wherein the second comparison circuit compares the voltage on the third pin with a second voltage threshold and generates a second comparison signal;

a maximum ON-time control circuit coupled to the fourth pin and the fifth pin, wherein the maximum ON-time control circuit generates a maximum ON-time control signal when a time period after the auxiliary switch is turned ON reaches the maximum ON-time threshold; and a logic circuit coupled to the first comparison circuit, the second comparison circuit and the maximum ON-time control circuit, wherein the logic circuit turns ON the auxiliary switch based on the first comparison signal, and turns OFF the auxiliary switch based on the second comparison signal or the maximum ON-time control signal; and wherein the maximum ON-time control circuit comprising:

a first capacitor having a first terminal that is coupled to the fifth pin and a second terminal that is coupled to the second pin, wherein the external resistor is arranged outside of the integrated circuit and is coupled between the first pin and the fifth pin;

a first transistor having a first terminal, a second terminal and a control terminal, wherein the first terminal is coupled to the first terminal of the first capacitor, the second terminal is coupled to the second pin, the control terminal is coupled to the fourth pin through a one-shot circuit; and a third comparison circuit having a first input terminal, a second input terminal and an output terminal, wherein the first input terminal is coupled to the fifth pin, the second input terminal is coupled to receive a reference voltage, the third comparison circuit generates the maximum ON-time control signal at the output terminal.

* * * * *